US009606301B2

(12) United States Patent
Lin

(10) Patent No.: US 9,606,301 B2
(45) Date of Patent: Mar. 28, 2017

(54) MEASURING METHOD FOR OPTICAL FIBER HOLE INSERT

(71) Applicant: ScienBiziP Consulting (Shenzhen) Co., Ltd., Shenzhen (CN)

(72) Inventor: I-Thun Lin, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 459 days.

(21) Appl. No.: 14/269,188

(22) Filed: May 4, 2014

(65) Prior Publication Data

US 2014/0237835 A1 Aug. 28, 2014

Related U.S. Application Data

(62) Division of application No. 12/915,012, filed on Oct. 29, 2010, now Pat. No. 8,789,823.

(30) Foreign Application Priority Data

May 11, 2010 (TW) .............................. 099114921 A

(51) Int. Cl.
 B23P 19/00 (2006.01)
 G02B 6/38 (2006.01)
 G02B 6/36 (2006.01)
 G01B 5/008 (2006.01)

(52) U.S. Cl.
 CPC ............. *G02B 6/385* (2013.01); *G01B 5/008* (2013.01); *G02B 6/3616* (2013.01); *G02B 6/3636* (2013.01); *G02B 6/3865* (2013.01); Y10S 269/903 (2013.01)

(58) Field of Classification Search
 CPC ........... B23P 19/04; B23P 19/00; B23P 19/10; B23Q 3/00; B23Q 3/06; B23Q 3/154
 See application file for complete search history.

(56) References Cited

U.S. PATENT DOCUMENTS

| 6,215,942 | B1* | 4/2001 | DeMeritt | G02B 6/3801 385/134 |
| 7,316,390 | B2* | 1/2008 | Burlison | B25B 1/20 269/274 |
| 7,908,725 | B1* | 3/2011 | Irish | F16L 3/223 248/74.2 |
| 8,096,538 | B2* | 1/2012 | Herbold | B25H 1/10 269/296 |

(Continued)

*Primary Examiner* — Lee D Wilson
(74) *Attorney, Agent, or Firm* — Zhigang Ma

(57) ABSTRACT

An apparatus for fixing an optical fiber hole insert in coordinate measurement, is provided. The apparatus includes a main body and a cover plate. The main body includes a front side surface, a back side surface and a support surface, a plurality of first grooves formed in the support surface and exposed at the front side surface, a plurality of second grooves formed in the support surface and exposed at the back side surface, and a through hole defined in the support surface. The first grooves are aligned with the respective second grooves, the first and second grooves communicate with the through hole and are configured for cooperatively receiving the optical fiber hole insert. The cover plate is configured for covering the support surface and making contact with the optical fiber hole insert. A method for measuring the optical fiber hole insert using the apparatus is also provided.

11 Claims, 6 Drawing Sheets

(56) References Cited

U.S. PATENT DOCUMENTS

| | | | | |
|---|---|---|---|---|
| 8,387,222 B2* | 3/2013 | Chen | ............... | B25B 27/02 269/314 |
| 8,789,823 B2* | 7/2014 | Lin | ............... | G02B 6/3616 269/274 |
| 2011/0280534 A1* | 11/2011 | Lin | ............... | G02B 6/3616 385/134 |
| 2014/0237835 A1* | 8/2014 | Lin | ............... | G02B 6/385 33/503 |

* cited by examiner

MEASURING METHOD FOR OPTICAL FIBER HOLE INSERT

CROSS-REFERENCE TO RELATED APPLICATION

This application is a divisional application of a commonly-assigned application entitled "FIXING APPARATUS AND MEASURING METHOD FOR OPTICAL FIBER HOLE INSERT," filed on Oct. 29, 2010 with application Ser. No. 12/915,012. The disclosure of the above-identified application is incorporated herein by reference.

FIELD

The present disclosure relates to precision connections for optical fibers.

BACKGROUND

Optical fiber connectors are widely used in optical fiber communications. Precision of the optical fiber connector, especially the optical fiber hole of the optical fiber connector is critical for reducing light losses of the optical fiber. The precision of the optical fiber hole is usually determined by an optical fiber hole insert of a mold, which is used to form the optical fiber hole, as such the insert needs to be carefully measured, including the size and the coarseness thereof Coordinate measurement instruments may include probe contact coordinate measurement instruments and optical non-contact coordinate measurement instruments, which are capable of performing coordinate measurements (usually three-dimensional measurements) of objects. Fixing apparatuses which are key components of the coordinate measurement instruments are used to fix the objects in position.

As shown in FIG. 6, a cylindrical shaped insert 30 for molding the optical fiber hole. Along the lengthwise direction of the insert 30 are three diametric steps. Diameters of the insert 30 decrease in steps from the distal end 31 to the end of the optical fiber hole mold portion 32. A length of the distal end 31 and length and diameter of each step of the optical fiber hole mold portion 32 need to be measured. However, as the entire insert 30 is cylindrical, it is difficult to position the insert 30. In addition, it is difficult to find a reference surface on the insert 30 for the coordinate measurements.

What is needed, therefore, are an apparatus for fixing an optical fiber hole insert in a coordinate measurement and a method for measuring the optical fiber hole insert.

BRIEF DESCRIPTION OF THE DRAWINGS

Many aspects of the present apparatus and method can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

DETAILED DESCRIPTION

Embodiments of the present apparatus and method will be described with reference to the drawings.

Figure 1:
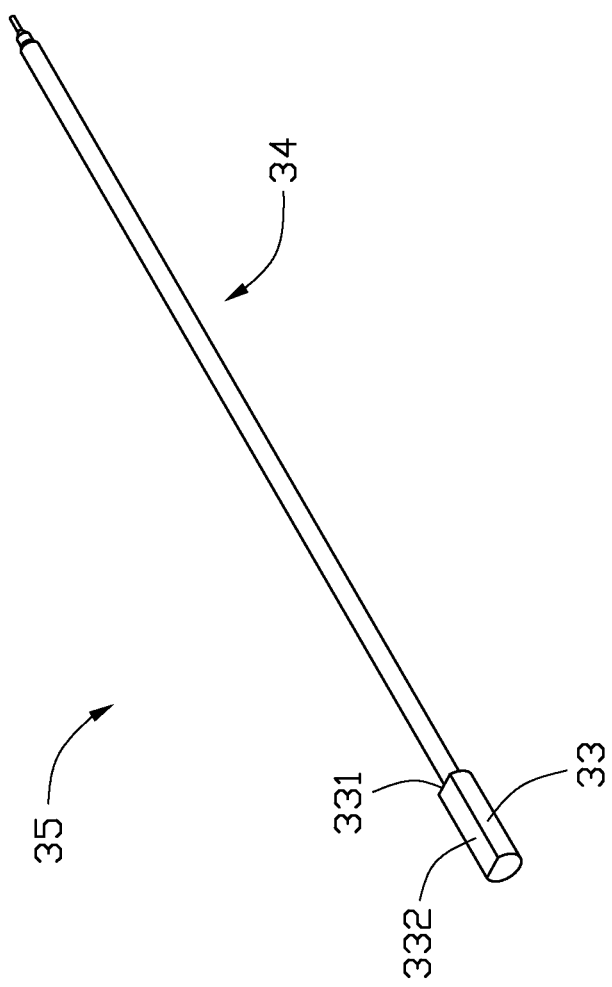
FIG. 1 shows a machined insert to be used in a coordinate measurement in accordance with an embodiment, the machined insert can be obtained by machining a conventional optical fiber hole insert.
Figure 2:
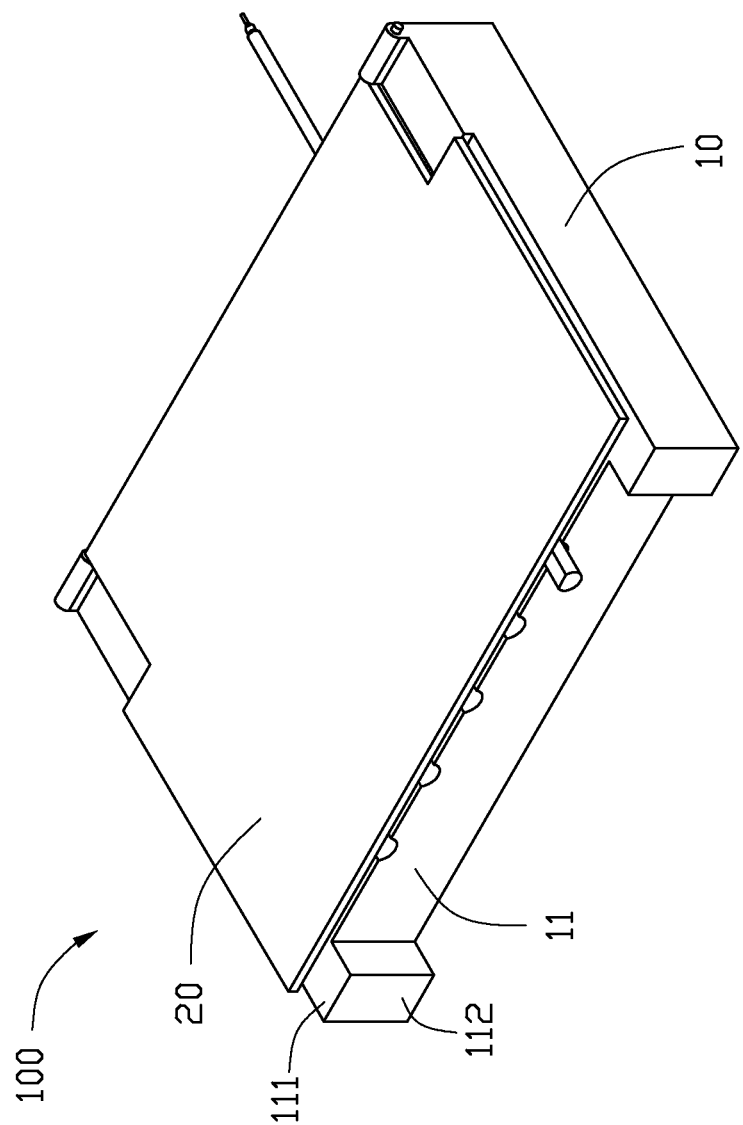
FIG. 2 shows an apparatus for optical fiber hole insert coordinate measurement in accordance with an embodiment, the apparatus fixing the machined insert therein.
Figure 3:
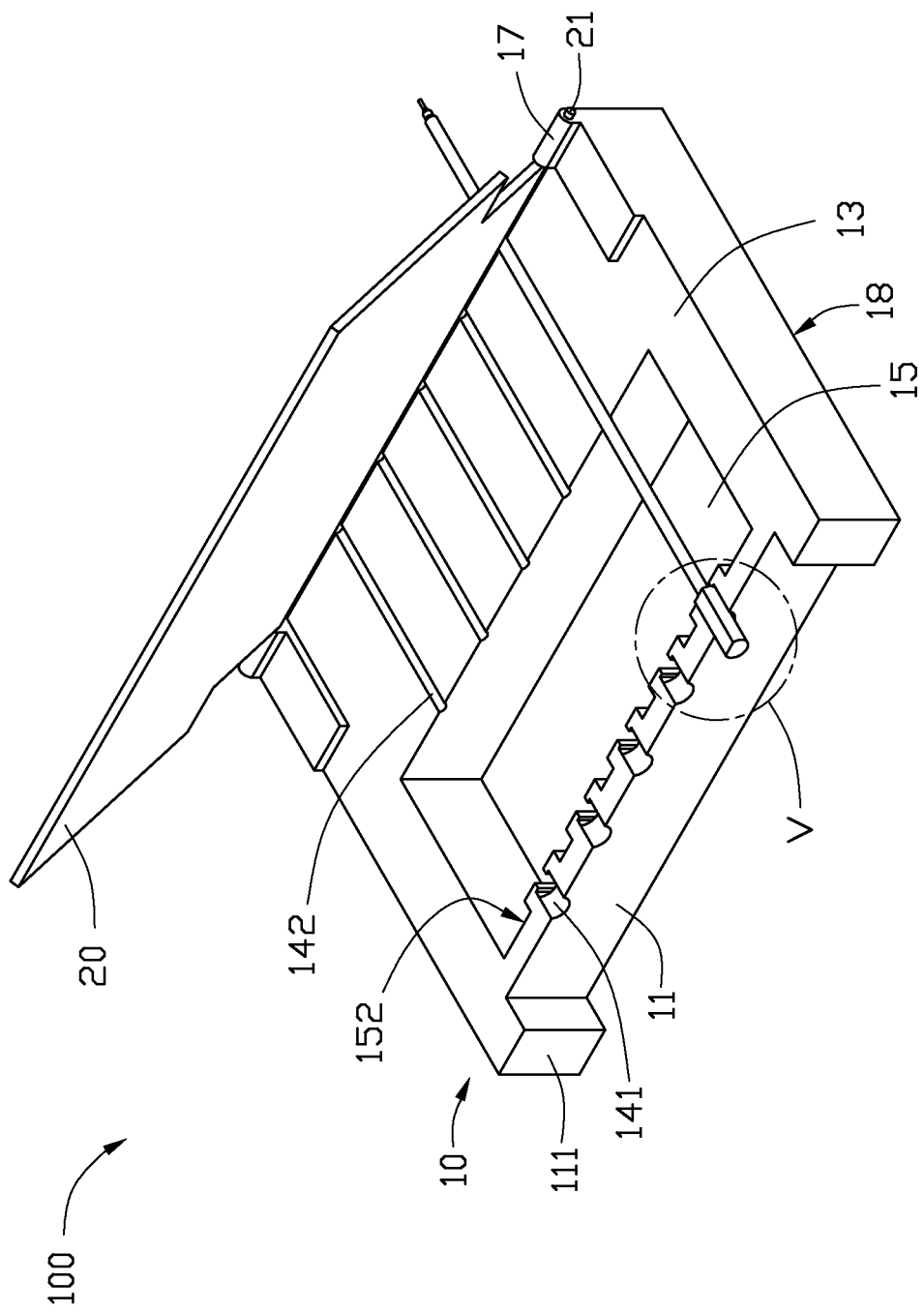
FIG. 3 is a second view of the apparatus of FIG. 2, wherein a cover plate of the apparatus is open.
Figure 4:
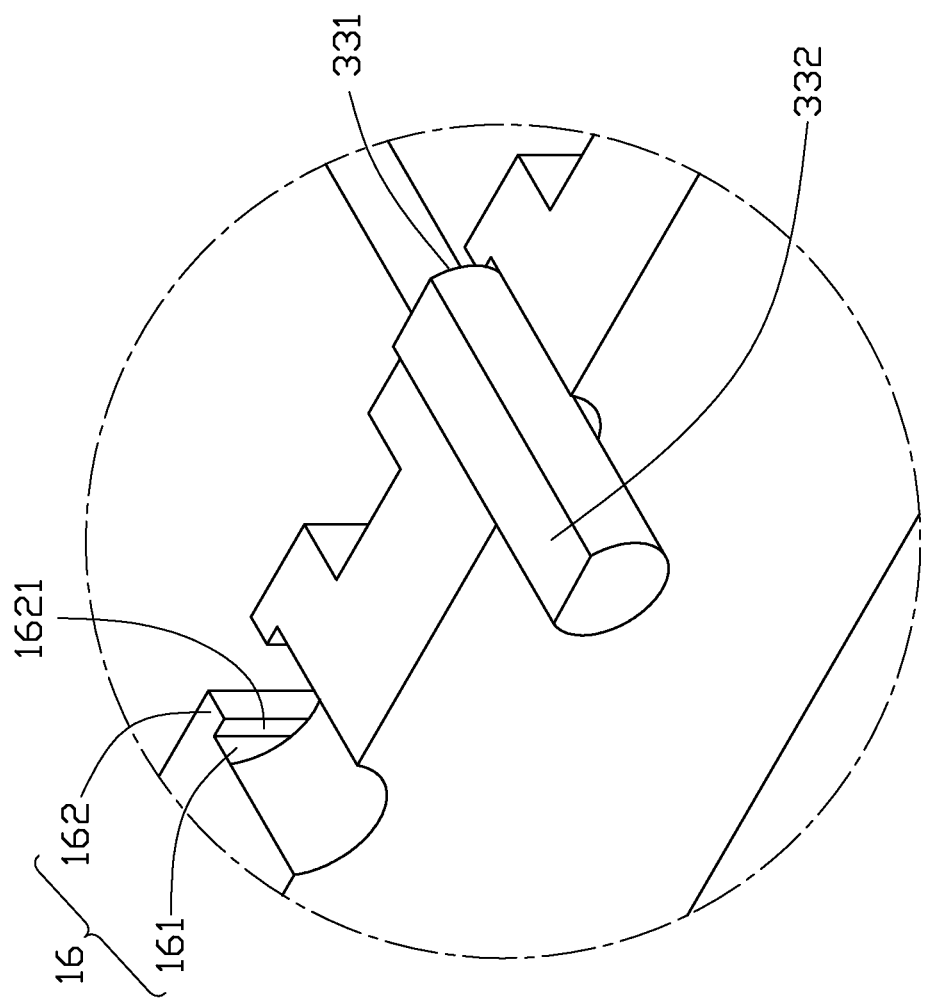
FIG. 4 is an enlarged view of portion V of the apparatus of FIG. 3.
Figure 5:
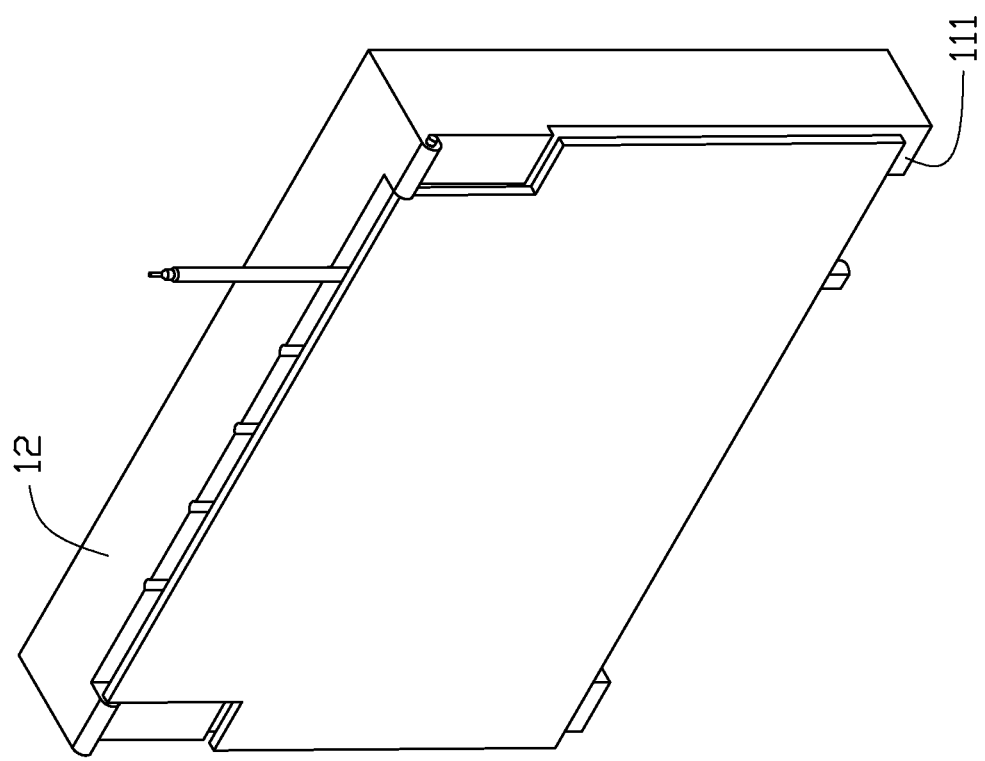
FIG. 5 is a third view of the apparatus of FIG. 2, wherein the apparatus stands up at 90 degrees to the supporting surface.
Figure 6:
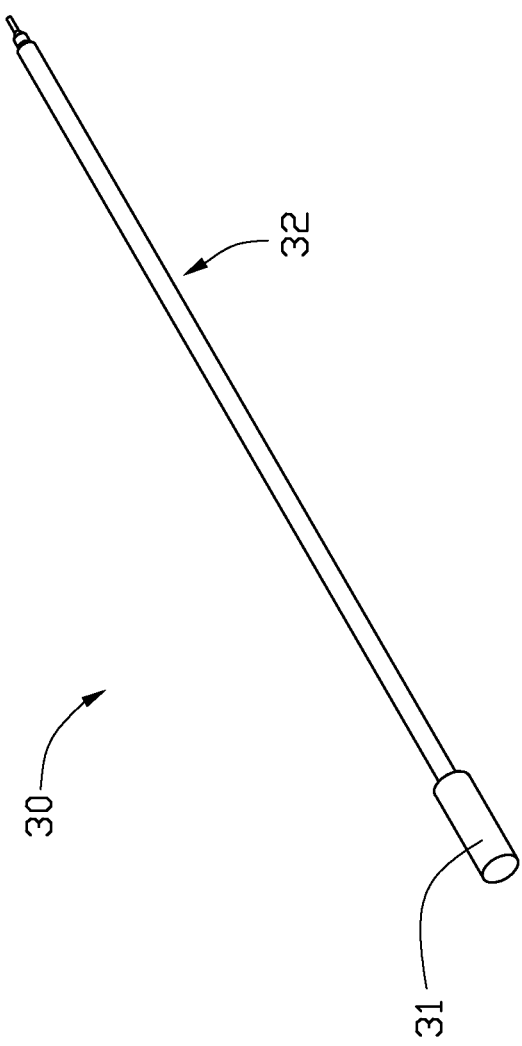
FIG. 6 is a schematic view of a conventional optical fiber hole insert for insert molding an optical fiber hole of an optical fiber connector.

Referring to FIGS. 1 to 5, an apparatus 100 for fixing an optical fiber hole insert in a coordinate measurement is provided. The apparatus 100 includes a main body 10 and a cover plate 20 pivotably mounted to the main body 10 by a pivot 21. A machined insert 35 is used in the coordinate measurement, and the machined insert 35 can be obtained by machining an insert 30 illustrated above.

Referring again to FIG. 1, the machined insert 35 also has a distal end 33 and three-step shaped optical fiber hole mold portion 34. The diameter of the machined insert 35 decreases in steps from the distal end 33 to the end of the optical fiber hole mold portion 34. A vertical surface 331 interconnects the distal end 33 and the optical fiber hole mold portion 34. The distal end 33 has a flat surface 332 formed thereon, the flat surface 332 is parallel with a central axis of the machined insert 35. The flat surface 332 can serve as a reference plane in the coordinate measurement. As the distal end 33 mainly serves as a support for the optical fiber hole mold portion 34, the flat surface 332 does not influence the optical fiber hole molding.

Referring again to FIGS. 2 to 5, the main body 10 is substantially rectangular in shape, and includes a top surface 13, a bottom surface 18, a front side surface 11, and a back side surface 12. The top surface 13 and the bottom surface 18 are positioned at opposite sides of the main body 10, and the front side surface 11 and the back side surface 12 are positioned at opposite sides of the main body 10. The top surface 13 and the bottom surface 18 are interconnected between the front side surface 11 and the back side surface 12. Two protrusions 111 are formed on the front side surface 11. Each of the protrusions 111 is smoothly connected to a lateral side surface of the main body 10, and has a flat end surface 112. The entire apparatus 100 can stand up (see FIG. 5) vertically by virtue of the flat end surfaces 112.

The top surface 13 serves as a support surface. Two pivot retaining members 17 are formed on the top surface 13, for retaining the pivot 21. The top surface 13 defines a number of first grooves 141 and corresponding second grooves 142 therein. Each of the first and second grooves 141, 142 has a semi-circular shape. The first grooves 141 are exposed at the front side surface 11, and the second grooves 142 are exposed at the back side surface 12. A through hole 15 is formed in the main body 10 between the top surface 13 and the bottom surface 18. The first and second grooves 141, 142 communicate with the through hole 15. In particular, the first grooves 141, the through hole 15 and the respective second grooves 142 are arranged in that order from the front side surface 11 to the back side surface 12. The first groove 141 retains the distal end 33 of the machined insert 35, and the second groove 142 retains the optical fiber hole mold portion 34 of the machined insert 35.

Referring again to FIGS. 3 and 4, the main body 10 further includes an inner side surface 152 in the through hole 15. The inner side surface 152 and the front side surface 11 are located at opposite ends of each of the first grooves 141, and the first grooves 141 are exposed at the inner side surface 152. A number of pairs of protrusions 16 extend from the inner side surface 152, and each pair of protrusions 16 are arranged opposite each other on the two sides of the first groove 141. Each of the protrusions 16 is substantially L shaped, and includes a first portion 161 extending from the inner side surface 152, and a second portion 162 of each pair of the protrusions 16 extending from the first portion 161. The two second portions 162 extend toward each other and have coplanar retaining surfaces 1621 facing toward the first grooves 141 for engaging with the machined insert 35.

In application, the machined insert 35 is placed in the main body 10, with the vertical surface 331 of the machined insert 35 retained on the retaining surface 1621 of the protrusions 16, and the flat surface 332 of the distal end 33 opposing the cover plate 20. As the first grooves 141 and the second grooves 142 are semi-circular, diameters of the distal end 33 and optical fiber hole mold portion 34 can be the same as, or a little greater or a little less than those of the first and second grooves 141 and 142 with the help of the closed cover plate 20. The flat surface 332 allows a better contact with the cover plate 20, thus the machined insert 35 is well positioned. A distance between the front and back side surfaces 11, 12 is less than that of the machined insert 35, thus a part of the distal end 33 and a part of the optical fiber hole molding portion 34 are located outside the cover plate 20.

Coordinate measurements of coarseness and size of the distal end 33 and the optical fiber hole mold portion 34 can be carried out from the front side, the back side, and the through hole 15 of the main body 10. Probe contact coordinate measurement or optical non-contact coordinate measurement can be used in the coordinate measurements.

Because of the flat surface 332, an X, Y Z coordinate system can be defined thereon, including the vertical surface 331 perpendicular thereto. In some embodiments, the cover plate 20 can be transparent to see the coordinate measurements.

A method for optical fiber hole insert coordinate measurement is also provided, the method may include the steps as follows. First, provide the apparatus 100 illustrated above. Second, machine a distal end of an optical fiber hole insert to be measured to form a flat surface 322 on the distal end, wherein the flat surface 322 is parallel with a central axis of the insert. Third, position the machined insert in the apparatus 100 and allow the cover plate 20 to make contact with the flat surface 322 of the machined insert. Fourth, perform coarseness and size coordinate measurement for the machined insert.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:
1. A method of measuring an optical fiber hole insert, the method comprising:
providing an apparatus comprising a main body and a cover plate, the main body comprising a front side surface, a back side surface and a support surface, the front side surface and the back side surface located at opposite sides of the main body, the support surface interconnected between the front side surface and the back side surface, a plurality of first grooves formed in the support surface and exposed at the front side surface, a plurality of second grooves formed in the support surface and exposed at the back side surface, and a through hole defined in the support surface between the plurality of first grooves and the plurality of second grooves, the first grooves aligned with the respective second grooves, the first and second grooves communicating with the through hole, a distance between the front and back side surfaces being less than a length of the optical fiber insert;
placing the optical fiber hole insert in one first groove and a corresponding second groove with both opposite ends of the optical fiber hole insert located outside the main body;
closing the cover plate on the main body to cover the support surface and come into contact with the optical fiber hole insert, thereby fixing the optical fiber hole insert in the first and second grooves; and
measuring the optical fiber hole insert.

2. The method of claim 1, wherein the optical fiber hole insert comprises a flat surface, the cover plate is brought into contact with the flat surface of the optical fiber hole insert.

3. The method of claim 2, wherein the optical fiber hole insert is measured based on a coordinate system defined on the flat surface.

4. The method of claim 1, wherein the main body further comprises an inner side surface in the through hole, the first grooves are exposed at the inner side surface, a plurality of pairs of protrusions extend from the inner side surface, each of the protrusions comprises a first portion extending from the inner side surface and a second portion extending away from the first portion, and the two second portions of each pair of the protrusions extend toward each other and have coplanar retaining surfaces facing toward the first grooves for engaging with the optical fiber hole insert.

5. The method of claim 1, wherein each of the first grooves and second grooves is in a semi-circular shape.

6. The method of claim 1, wherein the cover plate is pivotably mounted to the main body.

7. The method of claim 6, wherein the cover plate is transparent.

8. The method of claim 1, wherein two spaced protrusions are formed on the front side surface, and each of the protrusions comprises a flat end surface facing away from the front side surface.

9. The method of claim 1, wherein the plurality of first grooves, the through hole, and the plurality of second grooves are arranged in that order from the front side surface to the back side surface.

10. The method of claim 4, wherein each of the protrusions is substantially L-shaped.

11. The method of claim 10, wherein two retaining members are formed on the top surface, a pivot is retained by the two retaining members, and the cover plate is pivotably mounted on the top surface by the pivot.

* * * * *